United States Patent
Kim et al.

(10) Patent No.: US 9,769,813 B2
(45) Date of Patent: Sep. 19, 2017

(54) METHOD AND APPARATUS FOR TRANSMITTING DOWNLINK SIGNAL IN WIRELESS COMMUNICATION SYSTEM

(71) Applicant: LG ELECTRONICS INC., Seoul (KR)

(72) Inventors: Kijun Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 93 days.

(21) Appl. No.: 14/425,561

(22) PCT Filed: Sep. 5, 2013

(86) PCT No.: PCT/KR2013/008017
§ 371 (c)(1),
(2) Date: Mar. 3, 2015

(87) PCT Pub. No.: WO2014/038865
PCT Pub. Date: Mar. 13, 2014

(65) Prior Publication Data
US 2015/0230213 A1  Aug. 13, 2015

Related U.S. Application Data

(60) Provisional application No. 61/697,267, filed on Sep. 5, 2012.

(51) Int. Cl.
*H04W 72/04* (2009.01)
*H04L 5/00* (2006.01)
(Continued)

(52) U.S. Cl.
CPC .......... *H04W 72/042* (2013.01); *H04L 5/005* (2013.01); *H04L 5/0023* (2013.01);
(Continued)

(58) Field of Classification Search
CPC ............. H04W 72/0446; H04W 88/08; H04W 72/042; H04L 27/2626; H04L 5/0051; H04L 5/005; H04L 5/0023; H04L 5/0026
See application file for complete search history.

(56) References Cited

U.S. PATENT DOCUMENTS

2010/0118800 A1* 5/2010 Kim et al. ............... 370/329
2012/0120905 A1* 5/2012 Ko .................. H04B 7/0413
370/329

(Continued)

FOREIGN PATENT DOCUMENTS

WO  2011/085510      7/2011
WO  2011082543 A1   7/2011

OTHER PUBLICATIONS

European Patent Office Application No. 13835042.6, Search Report dated Mar. 22, 2016, 9 pages.

(Continued)

*Primary Examiner* — Phirin Sam
*Assistant Examiner* — Debebe Asefa
(74) *Attorney, Agent, or Firm* — Lee Hong Degerman Kang Waimey

(57) ABSTRACT

A method of transmitting a downlink signal at a base station in a wireless communication system includes generating a user equipment (UE)-specific reference signal sequence and mapping the generated sequence to resource elements (REs) predetermined according to antenna port groups. The REs for each antenna port group are divided on a frequency axis, on predetermined orthogonal frequency division multiplexing (OFDM) symbols of each slot, and the number of antenna port groups if the number of layers for transmitting the downlink signal is greater than 8 is twice the number of antenna port groups if the number of layers for transmitting the downlink data is equal to or less than 8.

8 Claims, 11 Drawing Sheets

(51) Int. Cl.
*H04W 88/08* (2009.01)
*H04L 27/26* (2006.01)

(52) U.S. Cl.
CPC ........ *H04L 5/0051* (2013.01); *H04L 27/2626* (2013.01); *H04W 72/0446* (2013.01); *H04L 5/0026* (2013.01); *H04W 88/08* (2013.01)

(56) References Cited

U.S. PATENT DOCUMENTS

| | | |
|---|---|---|
| 2012/0201187 A1 | 8/2012 | Koo et al. |
| 2012/0213186 A1 | 8/2012 | Ng et al. |
| 2014/0079146 A1* | 3/2014 | Kim .................... H04B 7/0417 375/260 |

OTHER PUBLICATIONS

Alcatel-Lucent, "Multiplexing of Different DCI Messages on ePDCCH" 3GPP TSG RAN WG1 Meeting #68, R1-120508, Feb. 6-10, 2012, 4 pages.
Qualcomm Europe, "UE-RS Patterns for ranks 5 to 8," 3GPP TSG-RAN WG1 #59, R1-094869, Nov. 2009, 9 pages.
Samsung, "DM-RS for Extended CP," 3GPP TSG RAN WG1 #61bis, R1-103654, Jul. 2010, 9 pages.
PCT International Application No. PCT/KR2013/008017, Written Opinion of the International Searching Authority dated Dec. 16, 2013, 12 pages.

* cited by examiner

FIG. 5
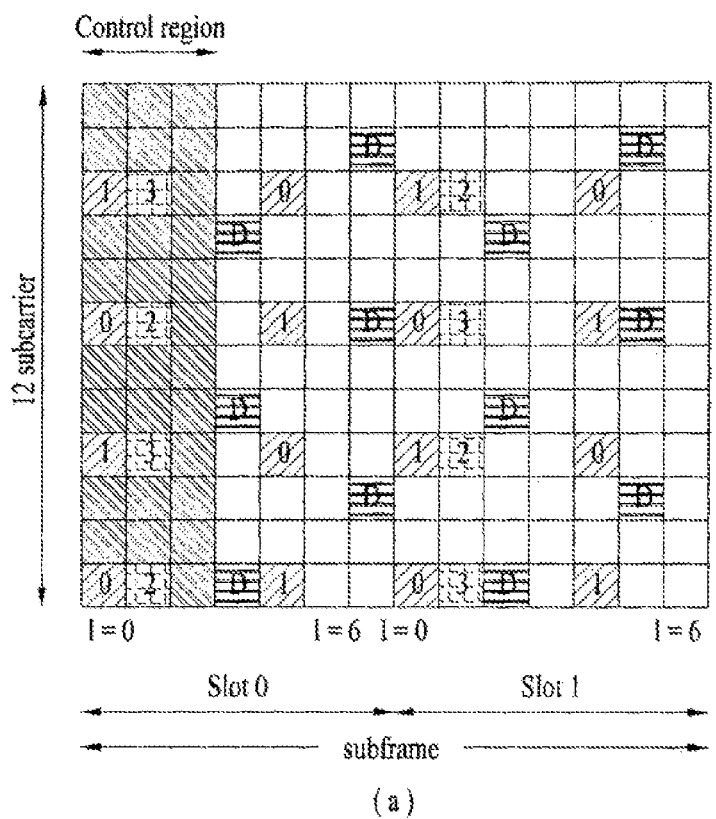
(a)
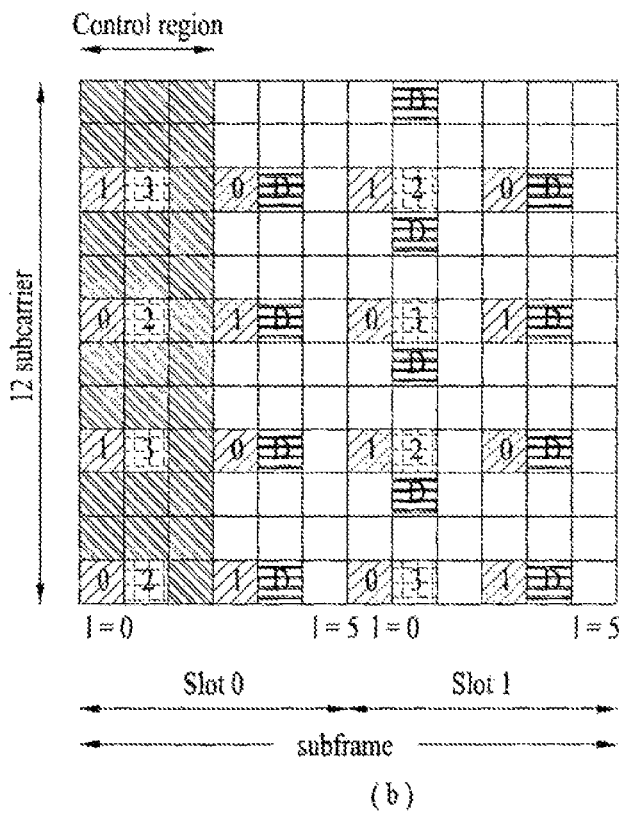
(b)

FIG. 6
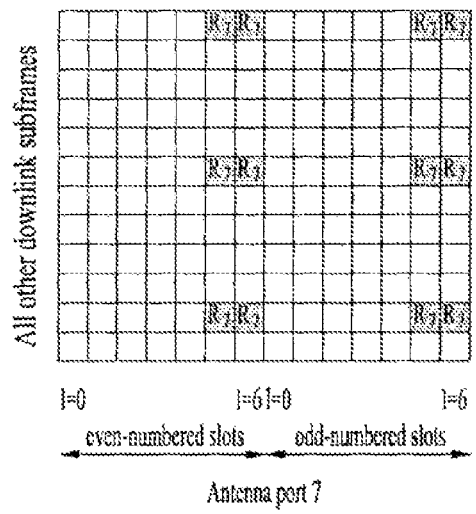
Antenna port 7
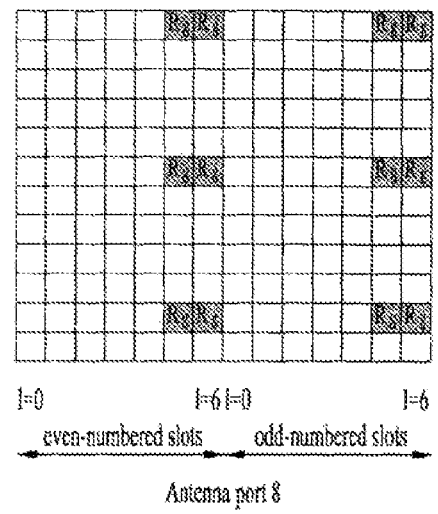
Antenna port 8
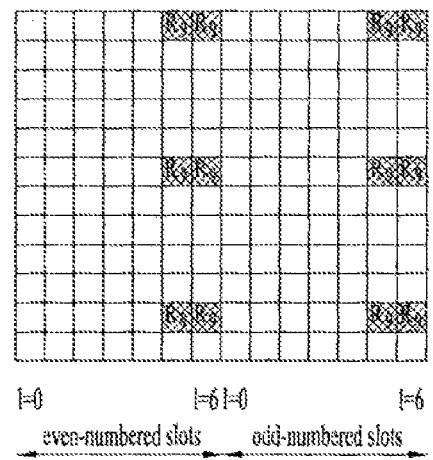
Antenna port 9
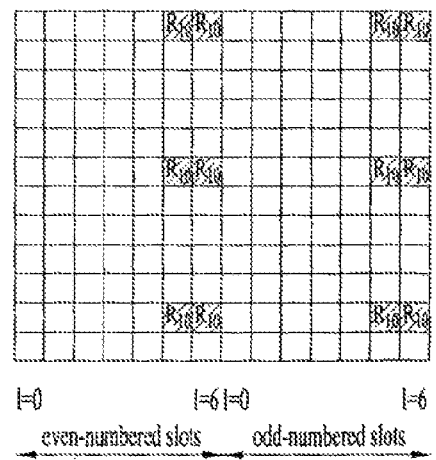
Antenna port 10 ically described hereinabove and the above and other objects that the present invention could achieve will be more clearly understood from the following detailed description.
METHOD AND APPARATUS FOR TRANSMITTING DOWNLINK SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2013/008017, filed on Sep. 5, 2013, which claims the benefit of U.S. Provisional Application Ser. No. 61/697,267, filed on Sep. 5, 2012, the contents of which are hereby incorporated by reference herein in their entirety.

TECHNICAL FIELD

The following description relates to a wireless communication system and, more particularly, to a method and apparatus for transmitting a downlink signal including a demodulation reference signal.

BACKGROUND ART

Wireless communication systems have been widely deployed in order to provide various types of communication services including voice or data. In general, a wireless communication system is a multiple access system that can support communication with multiple users by sharing available system resources (a bandwidth, transmission power, etc.). Examples of multiple access systems include Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Multi Carrier Frequency Division Multiple Access (MC-FDMA), etc.

DISCLOSURE

Technical Problem

An object of the present invention devised to solve the problem lies in a demodulation reference signal supporting more layers.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The object of the present invention can be achieved by providing a method of transmitting a downlink signal at a base station in a wireless communication system, including generating a user equipment (UE)-specific reference signal sequence, and mapping the generated sequence to resource elements (REs) predetermined according to antenna port groups, wherein the REs for each antenna port group are divided on a frequency axis, on predetermined orthogonal frequency division multiplexing (OFDM) symbols of each slot, and wherein the number of antenna port groups if the number of layers related to the number of layers related to downlink signal transmission is greater than 8 is twice the number of antenna port groups if the number of layers for transmitting the downlink data is equal to or less than 8.

In another aspect of the present invention, provided herein is a base station apparatus in a wireless communication system including a transmission module, and a processor, wherein the processor generates a user equipment (UE)-specific reference signal sequence and maps the generated sequence to resource elements (REs) predetermined according to antenna port groups, wherein the REs for each antenna port group are divided on a frequency axis, on predetermined orthogonal frequency division multiplexing (OFDM) symbols of each slot, and wherein the number of antenna port groups if the number of layers is greater than 8 is twice the number of antenna port groups if the number of layers for transmitting downlink signal is equal to or less than 8.

The aspects of the present invention may include the following features.

A minimum number of physical resource block (PRB) pairs necessary to include REs for all the antenna port groups if the number of layers is greater than 8 may be twice a minimum number of PRB pairs necessary to include the REs for all the antenna port groups if the number of layers is equal to or less than 8.

If the number of layers is greater than 8, a resource assignment unit for transmitting a physical downlink shared channel may be an integer multiple of two PRB pairs.

The locations and the number of REs, to which the sequence is mapped, in one PRB pair if the number of layers is greater than 8 may be equal to the locations and the number of REs, to which the sequence is mapped, in one PRB pair if the number of layers is equal to or less than 8.

If the number of layers is greater than 8, the locations of REs for a specific group on a frequency band may differ between a first slot and a second slot.

If the number of layers is greater than 8, a minimum number of PRB pairs necessary to include the REs for all the antenna port groups may be 2.

The number of REs for a specific group may differ between an even-numbered PRB pair of the two PRB pairs and an odd-numbered PRB pair of the two PRB pairs.

If the number of layers is greater than 8, the number of antenna port groups may be 4.

Among the four antenna port groups, REs for a first group, REs for a second group, REs for a third group and REs for a fourth group, respectively, may correspond to $1^{st}$, $11^{th}$ and $18^{th}$ subcarriers, $2^{nd}$, $12^{th}$ and $19^{th}$ subcarriers, $6^{th}$, $13^{th}$ and $23^{rd}$ subcarriers and $7^{th}$, $14^{th}$ and $24^{th}$ subcarriers from the lower frequency band of the two PRB pairs.

The predetermined OFDM symbols may be the last two symbols in each slot.

A minimum number of PRB pairs necessary to include the REs for all the antenna port groups if the number of layers is greater than 8 may be equal to a minimum number of PRB pairs necessary to include the REs for all the antenna port groups if the number of layers is equal to or less than 8.

If the number of layers is greater than 8, the locations of REs for a specific group on a frequency band may differ between a first slot and a second slot.

Advantageous Effects

A demodulation reference signal structure according to the present invention support transmission of a maximum of 16 layers, thereby enabling downlink transmission using a larger number of layers.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 is a view referred to for describing Reference Signals (RSs);

FIG. 6 is a diagram illustrating a demodulation reference signal;

BEST MODE

Figure 1:
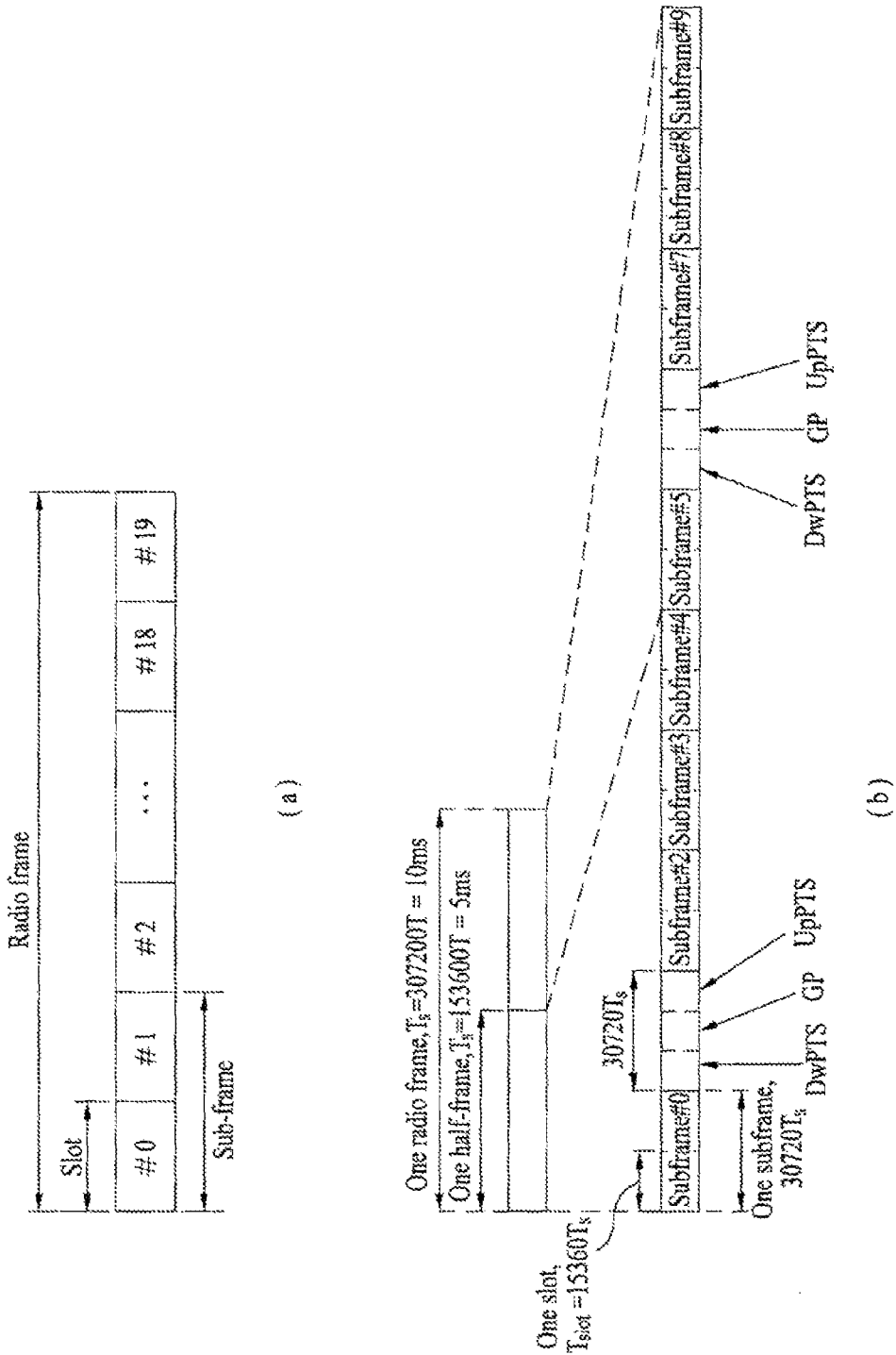
FIG. 1 illustrates the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM, symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
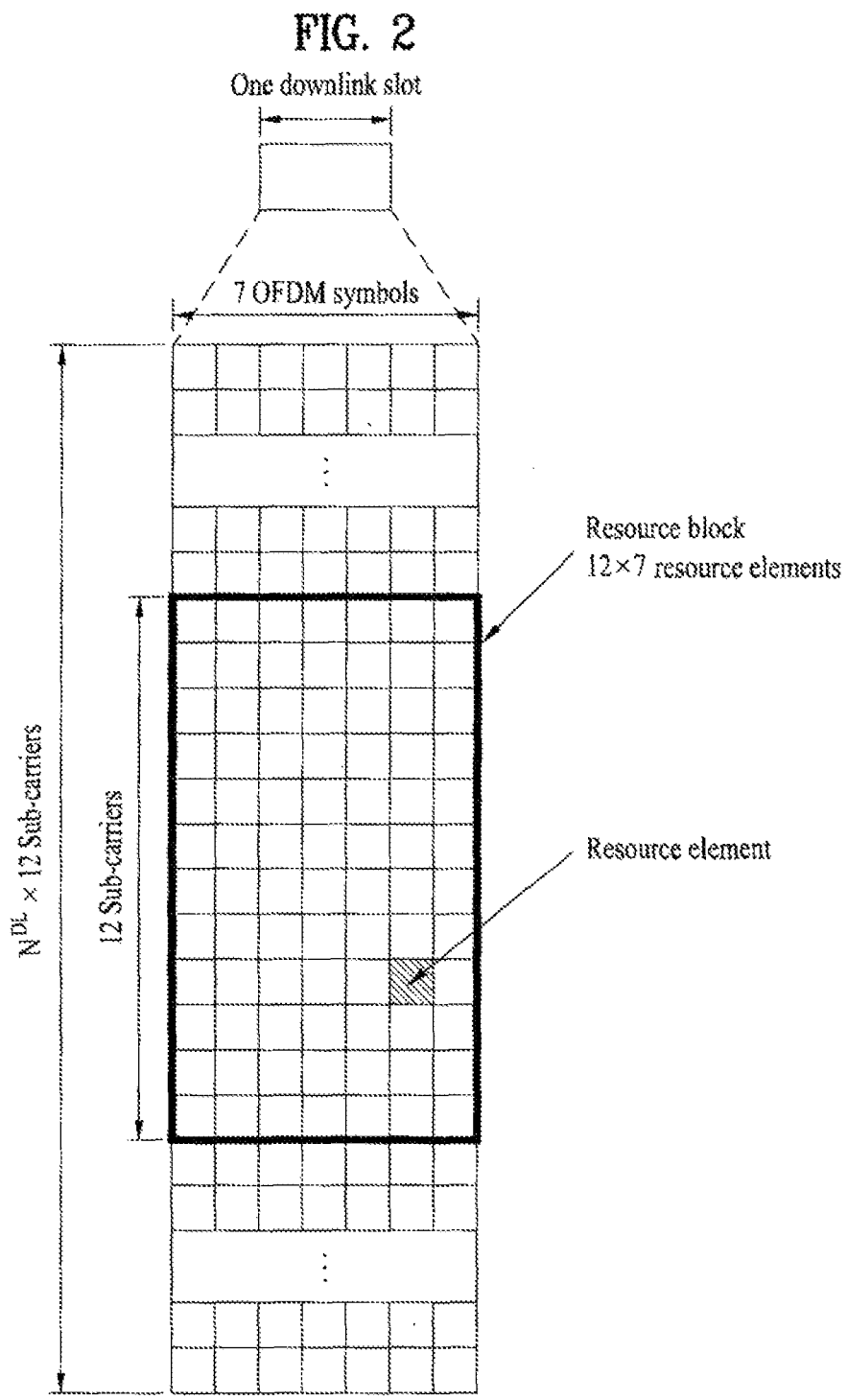
FIG. 2 illustrates the structure of a downlink resource grid for the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, $N^{DL}$ depends on a downlink transmission bandwidth. An uplink slot may have the same structure as a downlink slot.

Figure 3:
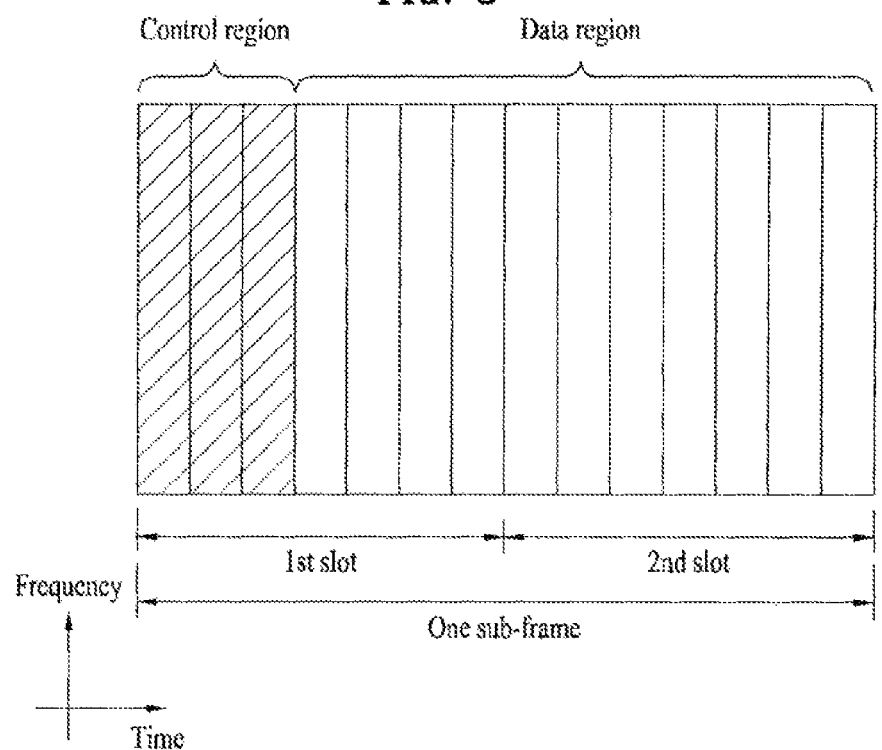
FIG. 3 illustrates the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
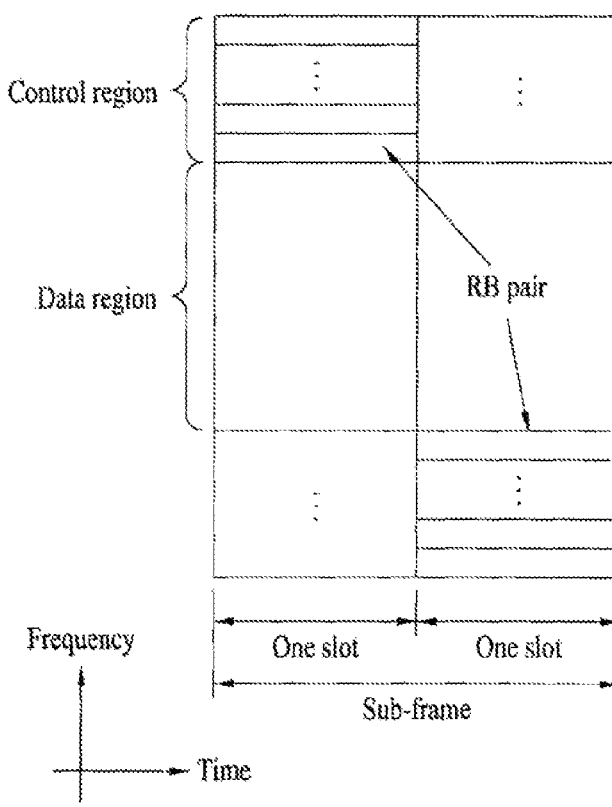
FIG. 4 illustrates the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIG. 5(*a*)) and 12 OFDM symbols in time in the case of the extended CP (see FIG. 5(*b*)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

Demodulation Reference Signal (DMRS)

A DMRS is used when a UE performs channel estimation for a PDSCH. The DMRS may be used in transmission modes 7, 8 and 9. The DMRS was initially defined for single-layer transmission of antenna port #5 and then has been extended for spatial multiplexing of a maximum of 8 layers. The DMRS, which is also referred to as a UE-specific reference signal, is transmitted for one specific UE. Accordingly, the DMRS may be transmitted only in an RB in which a PDSCH for the specific UE is transmitted.

Generation of a DMRS for a maximum of 8 layers will now be described. The DMRS may be transmitted in a state in which a reference-signal sequence r(m) generated according to Equation 1 is mapped to a complex-valued modulation symbols $a_{k,l}^{(p)}$ according to Equation 2. FIG. 6 shows antenna ports 7 to 10, in which the DMRS is mapped to a resource grid on a subframe in the normal CP case according to Equation 2.

$$r(m) = \frac{1}{\sqrt{2}}(1 - 2 \cdot c(2m)) + j\frac{1}{\sqrt{2}}(1 - 2 \cdot c(2m+1)), \quad \text{Equation 1}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

where, r(m) denotes a reference signal sequence, c(i) denotes a random pseudo sequence, and $N_{RB}^{max,DL}$ denotes a maximum number of RB of a downlink bandwidth.

$$a_{k,l}^{(p)} = w_p(l') \cdot r(3 \cdot l' \cdot N_{RB}^{max,DL} + 3 \cdot n_{PRB} + m') \quad \text{Equation 2}$$

$$w_p(i) = \begin{cases} \overline{w}_p(i) & (m' + n_{PRB})\bmod 2 = 0 \\ \overline{w}_p(3-i) & (m' + n_{PRB})\bmod 2 = 1 \end{cases}$$

$$k = 5m' + N_{sc}^{RB} n_{PRB} + k'$$

$$k' = \begin{cases} 1 & p \in \{107, 108\} \\ 0 & p \in \{109, 110\} \end{cases}$$

$$l = \begin{cases} l'\bmod 2 + 2 & \text{if in a special subframe with configuration 3, 4, 8 or 9} \\ l'\bmod 2 + 2 + 3\lfloor l'/2 \rfloor & \text{if in a special subframe with configuration 1, 2, 6 or 7} \\ l'\bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6 or 7} \\ 0, 1 & \text{if } n_s \bmod 2 = 0 \text{ and not in special subframe with configuration 1, 2, 6 or 7} \\ 2, 3 & \text{if } n_s \bmod 2 = 1 \text{ and not in special subframe with configuration 1, 2, 6 or 7} \end{cases}$$

$$m' = 0, 1, 2$$

As can be seen from Equation 2, when the reference signal sequence is mapped to the complex-valued modulation symbols, an orthogonal sequence $\overline{w}_p(i)$ shown in Table 1 is applied according to antenna port.

TABLE 1

| Antenna port $p$ | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

The DMRS may be used to perform channel estimation using different methods according to spreading factor 2 or 4. Referring to Table 1, in antenna ports 7 to 10, since the orthogonal sequence is repeated in the form of [a b a b], the spreading factor is 2. In antenna ports 11 to 14, the spreading factor is 4. If the spreading factor is 2, the UE may despread a DMRS of a first slot and a DMRS of a second slot using the spreading factor of 2 and then perform channel estimation via time interpolation. If the spreading factor is 4, the DMRS may be despread in the entire subframe using the spreading factor of 4 to perform channel estimation.

Channel estimation using the above-described spreading factor is advantageous in that, in case in which the spreading factor is 2, gain can be obtained by applying time interpolation with high mobility and gain may be obtained in decoding time by performing dispreading using the DMRS of the first slot and, in case in which the spreading factor is 4, a larger number of UE or ranks may be supported.

Figure 7:
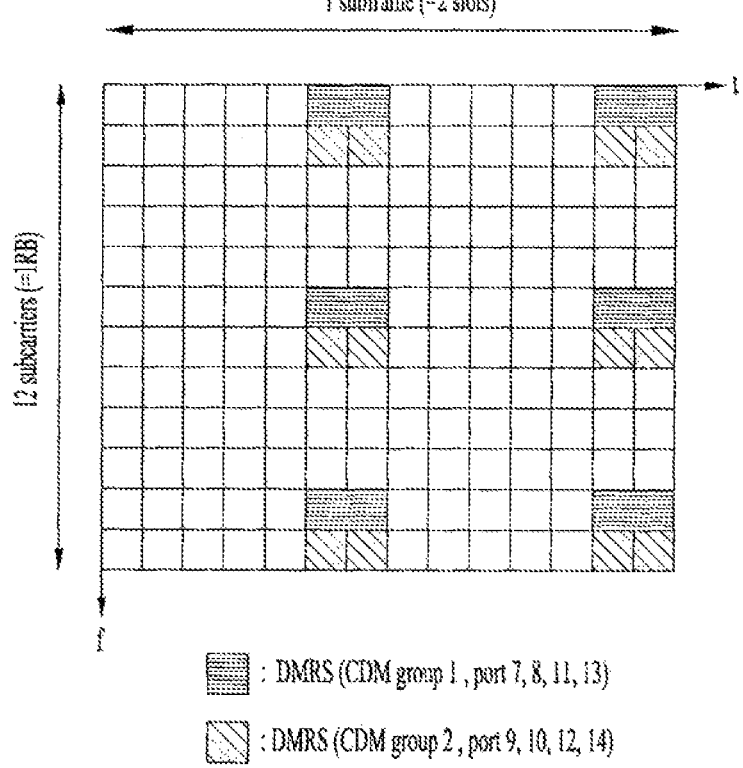
FIG. 7 is a diagram illustrating a code divisional multiplexing (CDM) group.

DMRS overhead will be described with reference to FIG. 7. FIG. 7 shows mapping of DMRSs to antenna ports 7 to 14 on a subframe. As shown in FIG. 7, the DMRSs may be divided into code divisional multiplexing (CDM) group 1 (or first antenna port group) and CMD group 2 (or second antenna port group) according to the location where the DMRS is mapped to the resource grid. The DMRSs are transmitted via antenna ports 7, 8, 11 and 13 in REs corresponding to CDM group 1 and the DMRSs are transmitted via antenna ports 9, 10, 12 and 14 in REs corresponding to CDM group 2. That is, in the antenna ports included in one CDM group, the REs, in which the DMRS is transmitted, are the same. If the DMRSs are transmitted only using the antenna ports corresponding to CDM group 1, resources necessary for the DMRSs are 12 REs, that is, DMRS overhead is 12. Similarly, if the antenna ports corresponding to CDM group 2 are used, DMRS overhead is 24.

The above-described DMRS may support a maximum of 8 layers (ranks) because, in an eNB having a maximum of 8 antennas in an existing LTE-A system, a maximum of 8 layers is supported upon PDSCH transmission for a downlink spatial multiplexing transmission scheme of SU-MIMO. An existing DMRS structure may not support transmission of more than 8 layers in 3D MIMO, massive MIMO, etc. Accordingly, hereinafter, a new DMRS structure supporting more than 8 layers and, more particularly, a maximum of 16 layers will be described.

Embodiment 1 of New DMRS Structure

A DMRS structure supporting a maximum of 16 layers, which is proposed by the present invention, supports four antenna port groups if the number of layers related to downlink signal transmission is greater than 8 (that is, twice the number of antenna groups if the number of layers is equal to or less than 8) and REs for each antenna port group may be divided on a frequency axis. In other words, if the number of transmission layers is 9 to 16, DMRS ports may be divided into four groups and subjected to frequency division multiplex (FDM) and DMRSs of a maximum of four ports in each group may be subjected to CDM and transmitted.

In this case, the minimum number of PRB pairs necessary to include the REs for all the four antenna port groups is 1, which is equal to the minimum number of PRB pairs if the number of layers is equal to or less than 8. Accordingly, the number of REs for one group if the number of layers is greater than 8 may be less than 12 which is the number of REs for one group if the number of layers is equal to or less than 8, and may be 8, for example.

If the number of layers is greater than 8, mapping of the antenna ports to the four antenna port groups is shown in Table 2 or 3.

TABLE 2

| | Antenna port group | | | |
|---|---|---|---|---|
| | A | B | C | D |
| DMRS port | 0, 1, 8, 12 | 2, 3, 9, 13 | 4, 5, 10, 14 | 6, 7, 11, 15 |

TABLE 3

| | Antenna port group | | | |
|---|---|---|---|---|
| | A | B | C | D |
| DMRS port | 0, 4, 8, 12 | 1, 5, 9, 13 | 2, 6, 10, 14 | 3, 7, 11, 15 |

DMRS ports 0, 1, 8 and 12 are subjected to CDM and transmitted in the REs of DMRS group A in Table 2 and DMRS ports 0, 4, 8 and 12 are subjected to CDM and transmitted in the REs of DMRS group A in Table 3.

Figure 8:
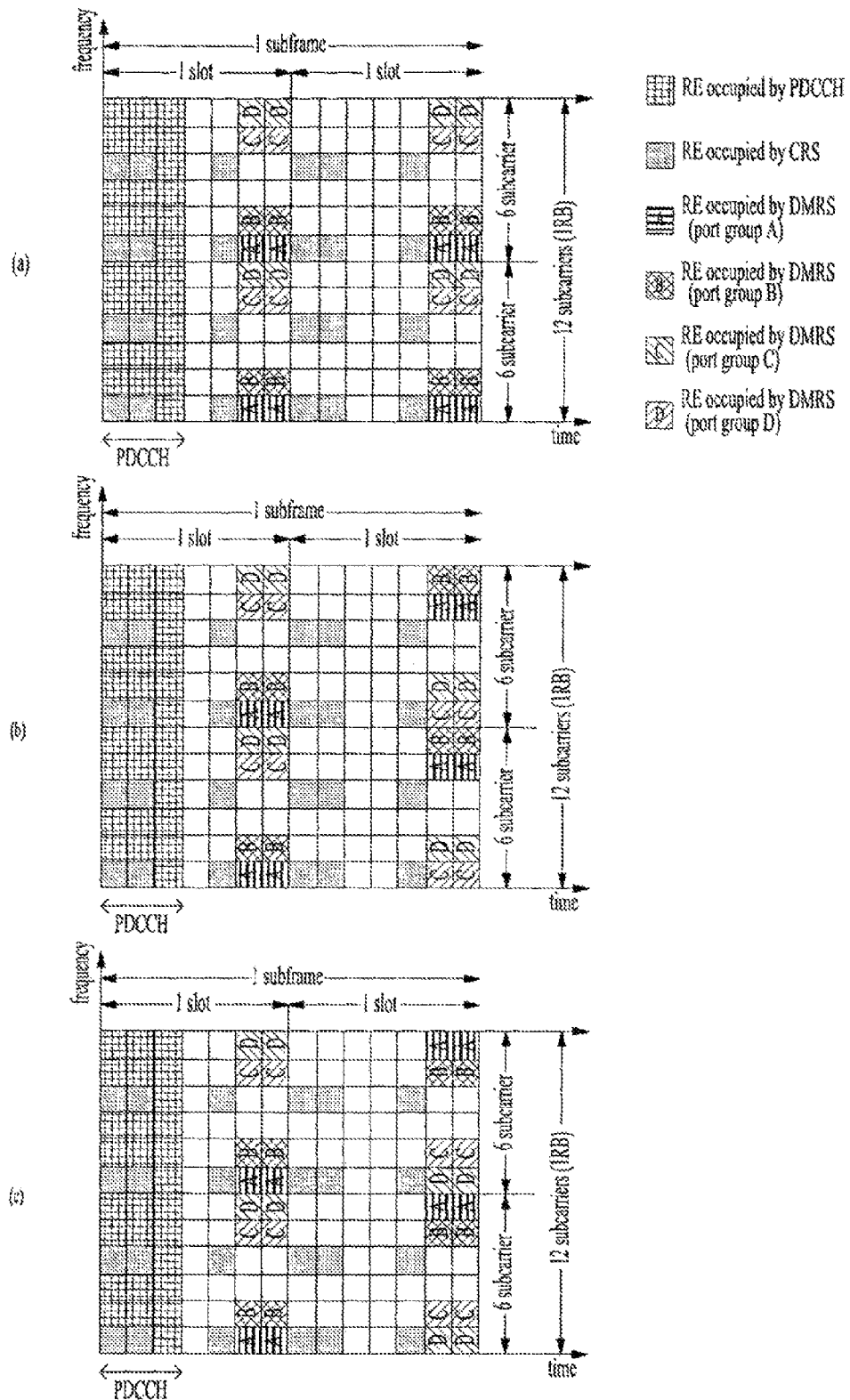
FIGS. 8 to 11 are diagrams illustrating a demodulation reference signal transmission structure according to an embodiment of the present invention.

FIG. 8 shows a new DMRS structure according to an embodiment of the present invention.

Referring to FIG. 8(a), in one PRB pair, REs for antenna port group A, REs for group B, REs for group C and REs for group D correspond to $0^{th}$ and $6^{th}$ subcarriers, $1^{st}$ and $7^{th}$ subcarriers, $4^{th}$ and $10^{th}$ subcarriers and $5^{th}$ and $11^{th}$ subcarriers, respectively. In general, REs for each antenna port group may be located on the last two OFDM symbols of each slot on a time axis. However, in a special subframe, the REs may be located on different OFDM symbols (e.g., third and fourth symbols of each slot or $3^{rd}$, $4^{th}$, $6^{th}$ and $7^{th}$ symbols of a first slot).

In FIG. 8(a), the locations of the REs for group A are $0^{th}$ and $6^{th}$ subcarriers. In this case, for example, in an $11^{th}$ subframe, channel estimation performance of a DMRS port belonging to DMRS group A may deteriorate. This is because the REs for each group are located at a predetermined distance on the frequency axis. In order to improve channel estimation performance deterioration, the DMRS structure shown in FIG. 8(b) or 8(c) may be used. Referring to FIGS. 8(b) and 8(c), it can be seen that the locations of REs for a specific group on a frequency band differ between a first slot and a second slot. FIGS. 8(b) and 8(c) are exemplary and different patterns may be applied in permuting of each group at shadow RE locations.

Figure 9:
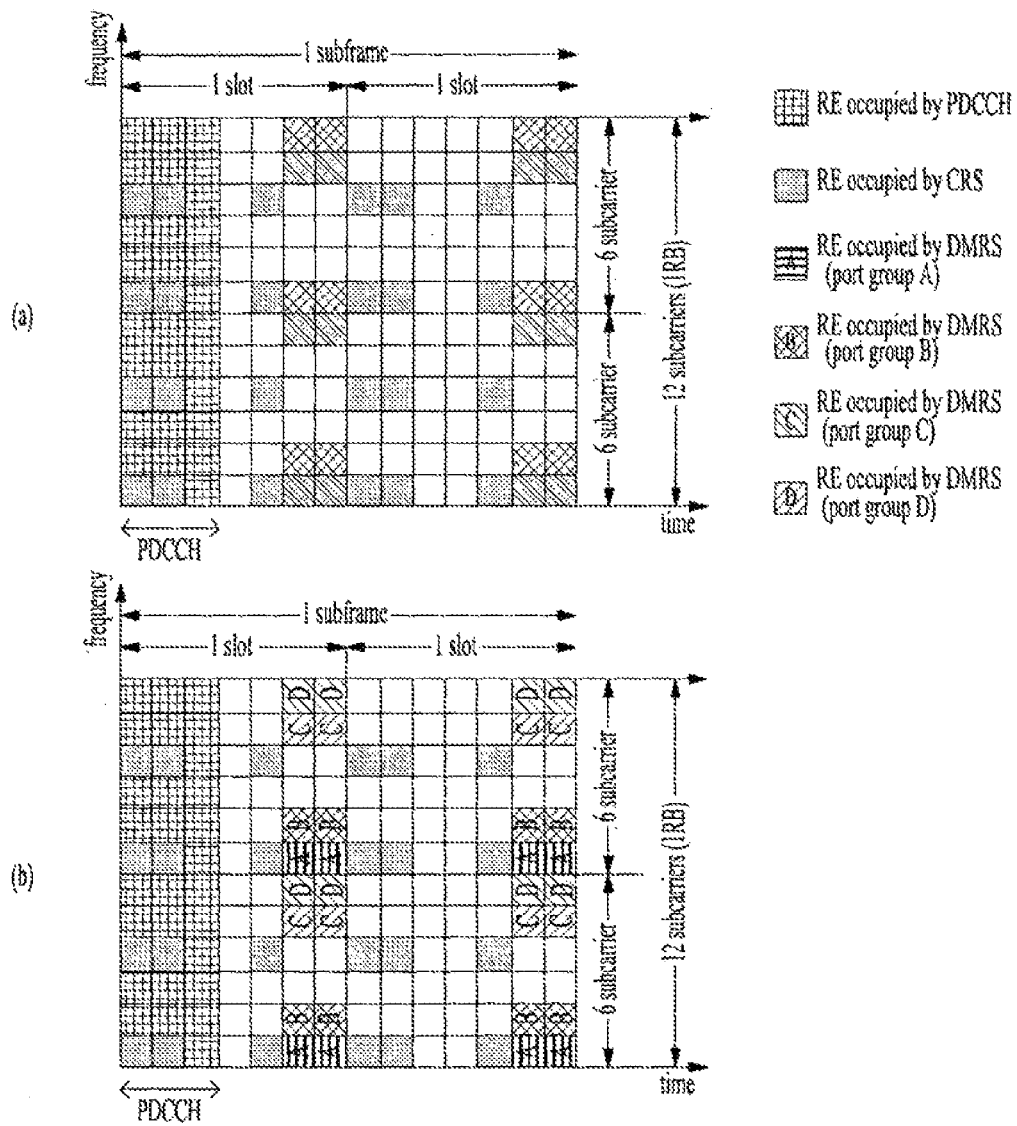

In the above description, different DMRS structures are used if the number of transmission layers is equal to or less than 8 and the number of transmission layers is greater than 8. That is, as shown in FIG. 9, if the number of layers is equal to or less than 8, (a) structure is used and, if the number of layer is greater than 8, (b) structure is used. In this case, DMRS overhead is 12 REs if the number of layers is 1 to 2, is 24 REs if the number of layers is 3 to 8, and is 32 REs if the number of layers is 8 to 16.

Figure 10:
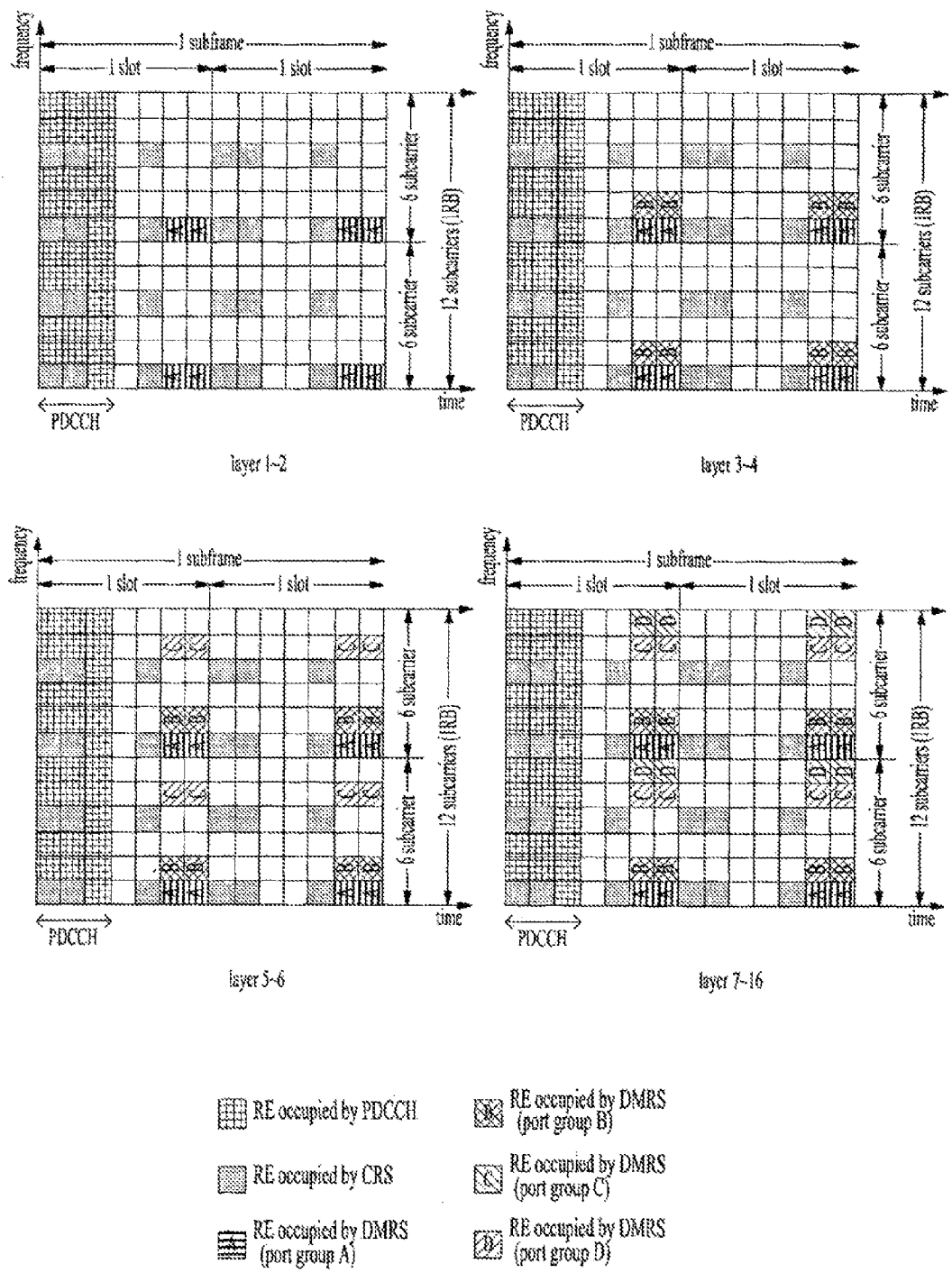

Although different DMRS structures may be used according to the number of layers, the above-described new DMRS structure may be used as a single DMRS structure for all layers. This is shown in FIG. 10. The DMRS structure of FIG. 10 is equal to that of FIG. 8(a) and mapping of antenna ports to each groups is equal to that of Table 2. Referring to FIG. 10, the DMRS structure of FIG. 8(a) is used with respect to all layers. DMRS overhead is 8 REs if the number of layer is 1 to 2, is 16 REs if the number of layers is 3 to 4, is 24 REs if the number of layers is 5 to 6, and is 32 REs if the number of layers is 7 to 16.

Embodiment 2 of New DMRS Structure

The DMRS structure for 9 to 16 layers according to Embodiment 2 of the present invention supports four antenna port groups (that is, twice the number of antenna groups if the number of layers is equal to or less than 8) and the REs for each antenna port group may be divided on a frequency axis. In other words, if the number of transmission layers is 9 to 16, the transmission DMRS ports may be divided into four groups and are subjected to FDM and the DMRSs of a maximum of four ports in each group may be subjected to CDM and transmitted.

In addition, the minimum number of PRB pairs necessary to include the REs for all the four antenna port groups is twice the minimum number (=1) of PRB pairs necessary to include all the antenna port groups if the number of layers is equal to or less than 8. That is, if the number of transmission layers is 9 to 16, the DMRS are transmitted over two consecutive PRBs. If the number of transmission layers is greater than 8, since the DMRSs for each antenna port group are transmitted via two consecutive PRB pairs, a resource assignment unit for transmitting the PDSCH may be 2 RBs.

The locations and the number of REs for DMRS transmission in each of the consecutive PRB pairs may be equal to the locations and the number of REs for DMRS transmission in existing LTE-A. In addition, mapping of four groups and antenna ports may be equal to the example of Table 2 or Table 3.

Figure 11:
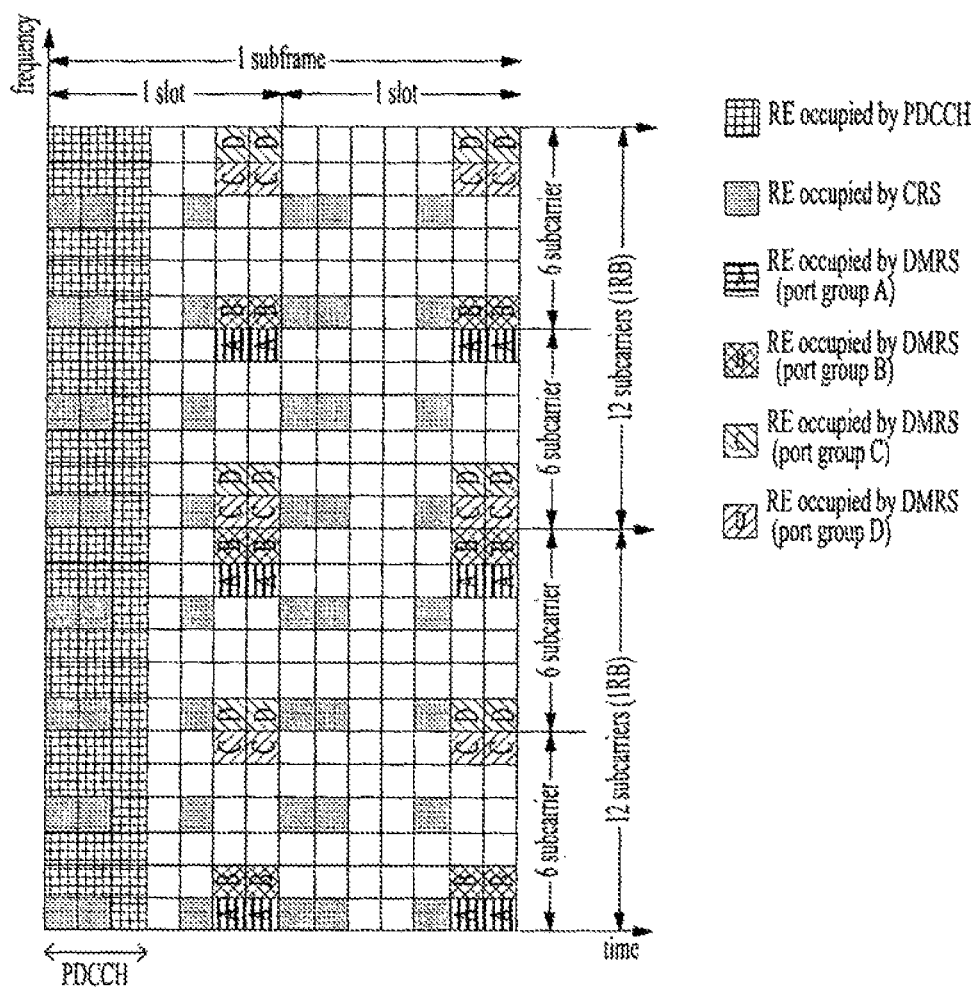
Figure 12:
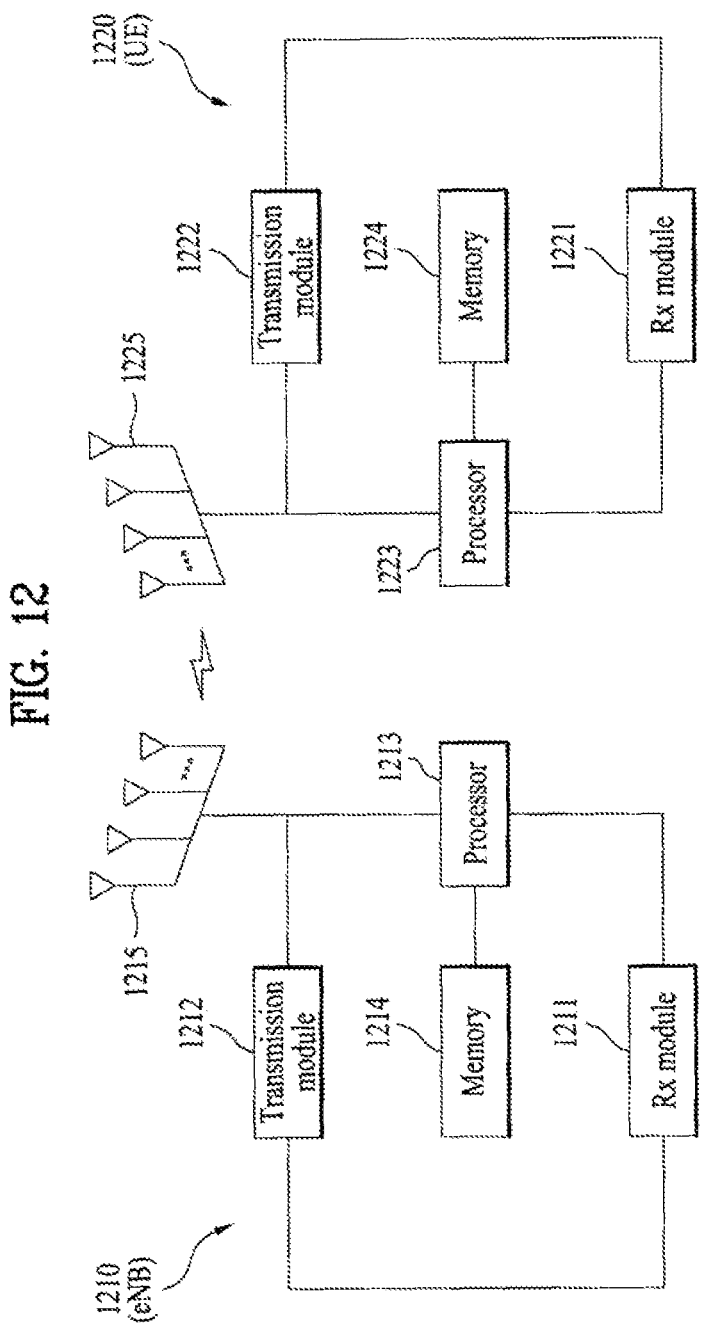
FIG. 12 is a diagram showing the configuration of a transmission/reception apparatus.

FIG. 11 shows an example of a DMRS structure according to Embodiment 2 of the present invention. Referring to FIG. 11, the DMRS structure uses two consecutive PRB pairs in order to include four antenna port groups (group A, group B, group C and group D). In each PRB pair, the locations and the number of REs for DMRS transmission are equal to the locations and the number of REs for DMRS transmission in conventional LTE-A used if the number of transmission layers is equal to or less than 8. In addition, the number of REs for a specific group differs between an even-numbered PRB pair (a lower PRB pair of FIG. 11) and an odd-numbered PRB pair (an upper PRB pair of FIG. 11). For example, in FIG. 11, groups A and B occupy 8 REs in an even-numbered PRB pair and occupy 4 REs in an odd-numbered PRB pair. Although the group arrangement on a frequency axis in a first slot and a second slot in FIG. 11 is depicted as same, the present invention is not limited thereto and different groups may be arranged as shown in FIGS. 8(b) and 8(c).

An eNB using the above-described DMRS structure may generate a UE-specific reference signal sequence for a specific UE, map the generated sequence to REs according to antenna port group and perform transmission. At this time, the DMRS structure shown in FIG. 6 may be used if the number of layers related to downlink signal transmission to the specific UE is equal to or less than 8 and the DMRS structure shown in FIG. 11 may be used if the number of layers is greater than 8. Accordingly, the eNB can cope with the case in which the number of transmission layers to the UE becomes greater than 8 due to 3D MIMO, etc.

Apparatus Configuration of Embodiment of the Present Invention

FIG. 10 is a block diagram of a transmission point and a UE according to an embodiment of the present invention.

Referring to FIG. 10, a transmission point 1010 according to the present invention may include an Rx module 1011, a Tx module 1012, a processor 1013, a memoryb 1014, and a plurality of antennas 1015. The plurality of antennas 1015 are used to support MIMO transmission and reception. The Rx module 1011 may receive uplink signals, data and information from a UE. The Tx module 1012 may transmit downlink signals, data and information to a UE. The processor 1013 may provide overall control to the operations of the transmission point 1010.

In accordance with an embodiment of the present invention, the processor 1013 may process necessary information in the afore-described measurement report, handover, random access, etc.

Besides, the processor 1013 processes information received by the transmission point 1010 and information to be transmitted from the transmission point 1010. The memory 1014 may store the processed information for a predetermined time and may be replaced with a component such as a buffer (not shown).

A UE 1020 according to the present invention may include an Rx module 1021, a Tx module 1022, a processor 1023, a memory 1024, and a plurality of antennas 1025. The plurality of antennas 1025 are used to support MIMO transmission and reception. The Rx module 1021 may receive downlink signals, data and information from an eNB. The Tx module 1022 may transmit uplink signals, data and information to an eNB. The processor 1023 may provide overall control to the operations of the UE 1020.

In accordance with an embodiment of the present invention, the processor 1023 may process necessary information in the afore-described measurement report, handover, random access, etc.

Besides, the processor 1023 processes information received by the UE 1020 and information to be transmitted from the UE 1020. The memory 1024 may store the processed information for a predetermined time and may be replaced with a component such as a buffer (not shown).

One or more of the above-described embodiments of the present invention may apply to the configurations of the transmission point and the UE, independently or in combination. Redundant descriptions are avoided for clarity.

The description of the transmission point 1010 may apply to a relay as a downlink transmission entity or an uplink reception entity, and the description of the UE 1020 may apply to the relay as a downlink reception entity or an uplink transmission entity in FIG. 10.

MODE FOR INVENTION

The embodiments of the present invention are applicable to various mobile communication systems.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

The invention claimed is:

1. A method of transmitting a downlink signal at a base station in a wireless communication system supporting more than 8 layers, the method comprising:
    transmitting a user equipment (UE)-specific reference signal sequence to a user equipment via each of sixteen antenna ports,
    wherein the UE-specific reference signal sequence is mapped to resource elements (REs) of each of the sixteen antenna ports, according to a predetermined pattern, on a data region of a downlink sub-frame having two slots on a time axis and a normal cyclic prefix (CP),
    wherein the sixteen antenna ports are grouped into four antenna port groups, each of the four antenna port groups having four antenna ports,
    wherein the UE-specific reference signal sequence is code division multiplexed in same REs of each of the four antenna ports belonging to a same antenna port group,
    wherein the predetermined pattern is defined such that the REs for each of the four antenna port groups occupy two sub-carriers on a frequency axis and the last two predetermined orthogonal frequency division multiplexing OFDM symbols in each of the two slots on the time axis,
    wherein a first antenna port group, a second antenna port group, a third antenna port group, and the fourth antenna port group among the four antenna port groups occupy $0^{th}$ and $6^{th}$ subcarriers, $1^{st}$ and $7^{th}$ subcarriers, $4^{th}$ and $10^{th}$ subcarriers, and $5^{th}$ and $11^{th}$ subcarriers on the frequency axis in a first slot of the two slots, respectively, and
    wherein, for each of the four antenna port groups, locations of the REs on the frequency axis differ between the first slot and a second slot of the two slots.

2. The method according to claim 1, wherein a minimum number of physical resource block (PRB) pairs necessary to include REs for all the antenna port groups when a number of layers is greater than 8 is twice a minimum number of PRB pairs necessary to include the REs for all the antenna port groups when the number of layers is equal to or less than 8.

3. The method according to claim 2, wherein, when the number of layers is greater than 8, a resource assignment unit for transmitting a physical downlink shared channel is an integer multiple of two PRB pairs.

4. The method according to claim 1, wherein, when a number of layers is greater than 8, locations of REs for each of the antenna port groups on a frequency band differ between the first slot and the second slot of the two slots.

5. The method according to claim 1, wherein a minimum number of PRB pairs necessary to include the REs for all the antenna port groups when a number of layers is greater than 8 is equal to a minimum number of PRB pairs necessary to include the REs for all the antenna port groups when the number of layers is equal to or less than 8.

6. A base station apparatus in a wireless communication system, comprising:
    a transmitter; and
    a processor operatively connected to the transmitter and configure to:
    transmit a user equipment (UE)-specific reference signal sequence to a user equipment via each of sixteen antenna ports,
    wherein the UE-specific reference signal sequence is mapped to resource elements (REs) of each of the sixteen antenna ports, according to a predetermined pattern, on a data region of a downlink sub-frame having two slots on a time axis and a normal cyclic prefix (CP),
    wherein the sixteen antenna ports are grouped into four antenna port groups, each of the four antenna port groups having four antenna ports,
    wherein the UE-specific reference signal sequence is code division multiplexed in same REs of each of the four antenna ports belonging to a same antenna port group,
    wherein the predetermined pattern is defined such that the REs for each of the four antenna port groups occupy two sub-carriers on a frequency axis and the last two predetermined orthogonal frequency division multiplexing OFDM symbols in each of the two slots on the time axis, wherein a first antenna port group, a second antenna port group, a third antenna port group, and the fourth antenna port group among the four antenna port groups occupy $0^{th}$ and $6^{th}$ subcarriers, $1^{st}$ and $7^{th}$ subcarriers, $4^{th}$ and $10^{th}$ subcarriers, and $5^{th}$ and $11^{th}$ subcarriers on the frequency axis in a first slot of the two slots, respectively, and wherein, for each of the four antenna port groups, locations of the REs on the frequency axis differ between a the first slot and a second slot of the two slots.

7. A method of receiving a downlink signal at a user equipment in a wireless communication system supporting more than 8 layers, the method comprising:

receiving a user equipment (UE)-specific reference signal sequence from a base station via each of sixteen antenna ports of the base station, wherein the UE-specific reference signal sequence is mapped to resource elements (REs) of the each of the sixteen antenna ports, according to a predetermined pattern, on a data region of a downlink sub-frame having two slots on a time axis and a normal cyclic prefix (CP), wherein the sixteen antenna ports are grouped into four antenna port groups, each of the four antenna port groups having four antenna ports, wherein the UE-specific reference signal sequence is code division multiplexed in same REs of each of the four antenna ports belonging to a same antenna port group, wherein the predetermined pattern is defined such that the REs for each of the four antenna port groups occupy two sub-carriers on a frequency axis and the last two predetermined orthogonal frequency division multiplexing OFDM symbols in each of the two slots on the time axis, wherein a first antenna port group, a second antenna port group, a third antenna port group, and the fourth antenna port group among the four antenna port groups occupy $0^{th}$ and $6^{th}$ subcarriers, $1^{st}$ and $7^{th}$ subcarriers, $4^{th}$ and $10^{th}$ subcarriers, and $5^{th}$ and $11^{th}$ subcarriers on the frequency axis in a first slot of the two slots, respectively, and wherein, for each of the four antenna port groups, locations of the REs on the frequency axis differ between the first slot and a second slot of the two slots.

8. A user equipment apparatus in a wireless communication system, comprising:

a transmitter; and a processor operatively connected to the transmitter and configure to:

receive a user equipment (UE)-specific reference signal sequence from a base station via each of sixteen antenna ports of the base station, wherein the UE-specific reference signal sequence is mapped to resource elements (REs) of each of the sixteen antenna ports, according to a predetermined pattern, on a data region of a downlink sub-frame having two slots on a time axis and a normal cyclic prefix (CP), wherein the sixteen antenna ports are grouped into four antenna port groups, each of the four antenna port groups having four antenna ports, wherein the UE-specific reference signal sequence is code division multiplexed in same REs of each of the four antenna ports belonging to a same antenna port group, wherein the predetermined pattern is defined such that the REs for each of the four antenna port groups occupy two sub-carriers on a frequency axis and the last two predetermined orthogonal frequency division multiplexing OFDM symbols in each of the two slots on the time axis, wherein a first antenna port group, a second antenna port group, a third antenna port group, and the fourth antenna port group among the four antenna port groups occupy $0^{th}$ and $6^{th}$ subcarriers, $1^{st}$ and $7^{th}$ subcarriers, $4^{th}$ and $10^{th}$ subcarriers, and $5^{th}$ and $11^{th}$ subcarriers on the frequency axis in a first slot of the two slots, respectively, and wherein, for each of the four antenna port groups, locations of the REs on the frequency axis differ between the first slot and a second slot of the two slots.

* * * * *